United States Patent Office 3,000,871
Patented Sept. 19, 1961

3,000,871
METHOD FOR PURIFYING POLYOLEFIN
Willem F. Engel, Amsterdam, Netherlands, assignor to Shell Oil Company, New York, N.Y., a corporation of Delaware
No Drawing. Filed Jan. 9, 1959, Ser. No. 785,789
Claims priority, application Netherlands Jan. 17, 1958
6 Claims. (Cl. 260—93.7)

This invention relates to a method for separating residual catalysts from polymeric olefins. More specifically, it relates to a method for removing residual catalyst containing chromium oxide on a silica-alumina carrier from polyolefin resins.

It is known that certain olefins may be polymerized in the presence of a catalyst of the above type and one method of conducting the polymerization is given in United States Patent 2,825,721. Other typical processes are shown in the copending United States applications Serial No. 774,106, filed November 17, 1958 and Serial No. 775,696, filed November 24, 1958 of the present inventor, Willem F. Engel and the copending United States applications of Willem F. Engel and Pieter Krijger Serial No. 758,539, filed September 2, 1958, now abandoned, and Serial No. 775,392, filed November 21, 1958. In the processes of this type, it is necessary to remove the catalyst in order to avoid a green color due to the chromium and to avoid other undesirable properties in the polymer such as corrosiveness and abrasion due to the chromium oxide and the alumina-silica present.

Usually the polymer is formed in the presence of an aliphatic solvent and substantial amounts of the polymer are present in solution while some polymer is still in solid form. However, when the polymerization is conducted under the most favorable conditions substantial amounts of polymer are formed which are solid even in the presence of the solvent because of the high molecular weight of the desired polymer. In addition, the high molecular weight polymer frequently adheres to the catalyst particles. Thus, the obvious method of separation, i.e., filtration, has certain disadvantages. Moreover, the catalyst particles are rather small and break into such fine particles that filtration does not remove as much catalyst as is desired. The small particles also tend to clog a filter and rapidly reduce the rate of filtration.

Thus, it is a primary object of this invention to provide a practical method of removing substantially all of the catalyst material by simple physical methods and without using filtration.

Another object of this invention is to provide a method of removing catalyst material which recovers the catalyst particles in substantially the form they have after polymerizing monoolefin.

These and other objects are accomplished by a process for separating catalysts containing chromium oxide on a silica-alumina carrier from olefin polymers comprising, adding an aqueous solution of a surface-active agent to said catalyst polyolefin mixture, heating said mixture and said solution to a temperature above the softening point of the polyolefin while increasing the pressure in an amount sufficient to prevent boiling of the water present in the medium, and agitating the medium to transfer catalyst from the organic phase comprising polyolefin to the aqueous phase.

As mentioned above, the polyolefin catalyst mixture generally comprises polymer, inorganic catalyst particles, and a solvent which is generally a hydrocarbon. The most desirable polyolefins are those having a high molecular weight and which are solid at ordinary temperatures. These high molecular weight polymers remain as solids even in the hydrocarbon solution unless the solution is heated to a temperature above the softening point of the polymer. Since the solid polymer tends to form on the surface of the catalyst, it is necessary to dissolve this solid polymer away from the catalyst before a mechanical separation can be achieved. Thus, one of the essential requirements of the present invention involves heating the polymer catalyst mixture together with its solvent to a temperature above the softening point of the polymer. It is also sometimes desirable to add additional solvent in order to assure solution of all of the polymer.

By the term organic phase, it is meant the polyolefin and any organic material which may be present along with the polyolefin. In general, there will be a hydrocarbon solvent used in the polymerization reaction, and there may be additional solvent as mentioned above. The aqueous phase will be mostly water and the surface-active agent dissolved therein.

In addition to removing the catalyst particles mentioned above, the present invention also removes other inorganic materials which may be present such as silica-alumina added for the purpose of increasing the efficiency of the catalyst.

When water is added to the above solution at a pressure sufficiently high so that the water does not boil, there is a tendency for the inorganic catalyst particles to collect at the interface of the water and organic phase. However, the catalyst particles have been wetted with the organic material and tend to remain in the organic phase.

It has now been found, quite unexpectedly, that when a surface-active agent is added to the water, the inorganic compounds shift from the organic phase over to the aqueous phase at the higher temperatures. In addition, it is found that this shifting is so complete at the higher temperatures required in the practice of this invention, that substantially all of the inorganic particles are removed from the organic phase. In addition, the inorganic particles still have their high surface and other physical characteristics so that it may be practical to re-use the catalyst by reactivating it.

As indicated above the temperature must be at least as high as the softening point of the polymer and this will usually be above 100° C. However, it is usually preferred to operate at a temperature above 150° C. to provide increased solubility. In order to use these higher temperatures it is, of course, necessary to use superatmospheric pressure to prevent the boiling of the water and/or solvent.

In general, any surface-active agent which is capable of effecting the transfer of catalyst particles of the above-mentioned type from the organic phase to the aqueous phase may be employed. As a class the non-ionic surface-active agents are preferred. The expression "non-ionic" refers to those compounds which are not salts and subject to ionization when dissolved in water. Examples of these agents include, among others, partial esters of polyhydric alcohols and saturated or unsaturated fatty acids and preferably fatty acids containing at least 6 and more preferably from 12 to 18 carbon atoms. These esters preferably have less than a majority of the hydroxyl groups of the polyhydric alcohol esterified or acylated. These include particularly the fatty acid esters of inner ethers of hexitol, especially those monoesters of saturated or unsaturated fatty acids of 12 to 18 carbon atoms and hexitans and hexitides such as sorbitan or mannitan monolaurate, monopalmitate, monostearate, monooleates, or the monoesters of coconut oil fatty acids and like products described in U.S. 2,322,820. Other examples of partial esters of this type include the pentaerythritol mono- and di-palmitate, pentaerythritol mono- and di-stearate, pentaerythritol mono- and di-oleate, 1,2,6-hexanetriol mono- and di-caproate, 1,2,6-hexanetriol mono- and di-oleate, trimethylolpropane distearate, trimethylolpropane dilaurate, polyglycerol dilaurate, inositol monolaurate, glucose monostearate, sucrose monooleate, polyglycol monooleate, polyglycol monostearate, and the like.

Particularly preferred non-ionic surface-active agents reside in the condensation products of a member of the group consisting of alcohols and phenols with a plurality of molecules of ethylene oxide. In general there will be from 8 to 20 moles of ethylene oxide per mole of alcohol or phenol, and usually the alcohol will contain from about 6 to 20 carbon atoms. The preferred phenols include phenols having an alkyl substitute in which the alkyl group will have at least 6 carbon atoms. Specific examples of surface-active agents include the condensation of cetyl alcohol or allyl alcohol with from 8 to 14 moles of ethylene oxide per mole of alcohol, octyl phenol condensed with 8 to 11 moles of ethyleneoxide, and octyl cresol condensed with 9 moles of ethylene oxide.

Suitable concentrations of the surface-active compounds in the water phase generally lie in the range of from 0.01 to 1% by weight. In certain cases however, it may be desirable to use more than 1 and less than 0.01% by weight of a surface-active compound. In the condensation products of alcohols and phenols with ethylene oxide the most favorable concentrations are in the range of from 0.05 to 0.2% by weight.

In order to increase the rate of transfer of inorganic catalyst particles from the organic phase to the aqueous, the two phases are stirred or otherwise agitated. Then the two phases are allowed to separate. The organic phase floats to the top of the water solution, and the catalyst particles settle to the bottom of the aqueous phase. Thus the system not only removes catalyst from the polymer solution, but it also carries the catalyst some distance away from the polymer. If desired, the separation of the liquid phases and the settling of the inorganic material may be accelerated by centrifuging.

After separation of catalyst and any carrier which may be present, the polyolefin and solvent are removed from the aqueous layer. If desired, the solvent may then be removed by distillation. The aqueous phase containing the surface-active agent may be used to treat more catalyst. Thus, it is seen that the purification according to this invention is simple and inexpensive in operation.

In order to illustrate the invention more fully, the following examples show a preferred way of carrying out the process:

EXAMPLE I

The starting catalyst was a commercial cracking catalyst consisting of fine spherical particles of a gel of alumina and silica; this cracking catalyst had the following properties:

Ratio by weight $Al_2O_3:SiO_2$ _____ 25:75
Particle size _____ 20–120 microns
Pore volume _____ 1 ml./gram
Surface area _____ 716 sq. m./gram 50 grams of this product were heated for 10 hours to 650° C. in an air stream containing 5% by volume of water vapor. The mixture of air and water vapor was passed over the oxides at a rate of 30 liters per hour. The mixture of the oxides was subsequently cooled to room temperature by a dry air stream. After this treatment the material had a surface area of 425 sq. m. per gram and was suitable as carrier for the chromium oxide.

55 ml. of an aqueous $CrO_3$ solution, which contained 1.442 grams of $CrO_3$ at this volume, were added to 30 grams of the carrier while stirring at a temperature of 20° C. This quantity of solution was the largest which could be absorbed by the carrier without unabsorbed liquid phase remaining.

After the impregnation the material was dried on a steam bath while stirring and subsequently air-dried at a temperature of 120° C. for one hour. It was then heated in a glass tube for 5 hours to a temperature of 500° C. while a carefully dried air stream was being passed through in a quantity of 30 liters per hour.

200 mg. of the resultant product were again heated to 500° C. in a glass tube for half an hour, dry air again being passed through. This tube was subsequently sealed by melting and only cooled afterwards so as to entirely prevent contact with moisture. The sealed tube which contained 200 mg. of catalyst (2.5% Cr) was placed in a carefully dried 300 ml. autoclave. After being closed, the autoclave was evacuated several times and purged with pure, oxygen-free nitrogen. The glass tube was broken by shaking, after which the autoclave was evacuated twice more and purged with nitrogen. 100 ml. of pure iso-octane (2,2,4-trimethyl pentane) were then introduced into the evacuated autoclave.

The mixture of the oxides with iso-octane was heated to 30° C. and kept at that temperature for 30 minutes.

Polymerization

At the temperature of 30° C. very pure ethylene was added to the autoclaves until a partial pressure of 10 atm. abs. was reached. The temperature was then raised to 130° C. The temperature range of from 70 to 120° C. was covered in 23 minutes, and the pressure was still below 20 atm. abs. when the temperature reached 120° C. The pressure was then gradually increased to 30 atm. abs., approximately one hour after the first contact of ethylene with the catalyst. After 4 hours, calculated from the first contact of ethylene with the catalyst, the autoclaves were cooled down and opened. The yield was 132 grams of polyethylene per gram of catalyst, so that the ash content was 0.8% by weight. The intrinsic viscosity was 2.2 (measured at 120° C. in decahydronaphthalene).

Unpolymerized ethylene was completely removed from the concentrated polyethylene solution obtained in the above-mentioned manner by reducing the pressure and loss of 2,2,4-trimethylpentane was avoided by cooling. Of the remaining solution 55 grams were transferred to an 800 ml. autoclave and diluted therein with an extra quantity of 145 grams of iso-octane, the temperature being increased to 170° C. After the dilution the concentration of the solution was 7.5%.

280 ml. of water having a small quantity of surface-active agent were then supplied by means of a pump at a temperature of 170° C. in the course of an hour with stirring. The surface-active agent was a condensation product of octyl phenol with 9 times as many molecules of ethylene oxide, and the concentration thereof in water was 0.1% by weight. After the water solution had been supplied the pressure was 13 kg./sq. cm. Stirring was continued for half an hour. The autoclave was then allowed to stand for 1 hour at 170° C. During the course of the next hour it was cooled to 50° C., at which time substantially all of the catalyst had settled into the aqueous layer. The polymer solution was removed from the autoclave and concentrated through evaporation. The polymer was then freed from the last remnants of solvent and traces of water at 90° C. in vacuo. The intrinsic viscosity was still 2.2. The ash content was then less than 0.05% by weight.

EXAMPLE II

The procedure of Example I was repeated except that the surface-active agent was replaced by one of the following materials. In this way three separate examples of polymer were treated, the first, with a condensation product of cetyl alcohol and 14 moles of ethylene oxide per mole of alcohol, the second, condensation product of oleyl alcohol and 14 moles of ethylene oxide per mole of alcohol, and the third, octyl cresol condensed with 9 moles of ethylene oxide per mole of cresol. In all cases, the green color due to chromium compounds disappeared from the polymer and the ash content of the purified polymer was below 0.1%.

Similarly good results are obtained when catalyst is separated from polypropylene in accordance with this invention.

I claim as my invention:

1. A process for the separation of a catalyst consisting essentially of chromium oxide carried on a alumina-silica carrier from olefin polymers and a hydrocarbon solvent comprising, adding an aqueous solution of from 0.1 to 1% by weight of a non-ionic surface-active agent to said catalyst-polyolefin mixture, heating said mixture and said solution to a temperature above the softening point of the polyolefin while increasing the pressure in an amount sufficient to prevent boiling of the water present in the medium, agitating the medium to transfer catalyst from the organic phase comprising polyolefin to the aqueous phase, and separating the organic phase containing polymer from the aqueous phase.

2. The process defined in claim 1, in which said mixture is heated to a temperature above 150° C. and the inorganic material is allowed to settle in the aqueous phase and is recovered therefrom.

3. A process for the separation of a catalyst consisting essentially of chromium oxide carried on an alumina-silica carrier from olefin polymers and a hydrocarbon solvent comprising, adding an aqueous solution of from 0.1 to 1% by weight of a non-ionic surface-active condensation product of a member of the class consisting of alcohols and phenols with ethylene oxide to said calatyst-polyolefin mixture, heating said mixture and said solution to a temperature above the softening point of the polyolefin while increasing the pressure in an amount sufficient to prevent boiling of the water present, agitating the medium to transfer inorganic particles from the organic phase to the aqueous phase, and separating the organic phase containing polymer from the aqueous phase.

4. The process defined in claim 3, in which the surface-active agent is the condensation product of an alcohol having from 6 to 20 carbon atoms with from 8 to 20 moles of ethylene oxide per mole of alcohol.

5. The process defined in claim 3, in which the surface-active agent is a phenol condensed from 8 to 20 moles of ethylene oxide.

6. The process defined in claim 3, in which said mixture is heated to a temperature above 150° C. and the surface-active agent is present in amount of from 0.05 to 0.2% of water by weight.

References Cited in the file of this patent

UNITED STATES PATENTS

| | | |
|---|---|---|
| 2,728,753 | Russum et al. | Dec. 27, 1955 |
| 2,825,721 | Hogan et al. | Mar. 4, 1958 |
| 2,838,477 | Roelen et al. | June 10, 1958 |

FOREIGN PATENTS

| | | |
|---|---|---|
| 801,554 | Great Britian | Sept. 17, 1958 |
| 804,081 | Great Britian | Nov. 5, 1958 |